July 14, 1936.    W. D. KIMBALL ET AL    2,047,272
MACHINE FOR PACKING ARTICLES IN BOXES
Filed Sept. 15, 1931    13 Sheets-Sheet 1
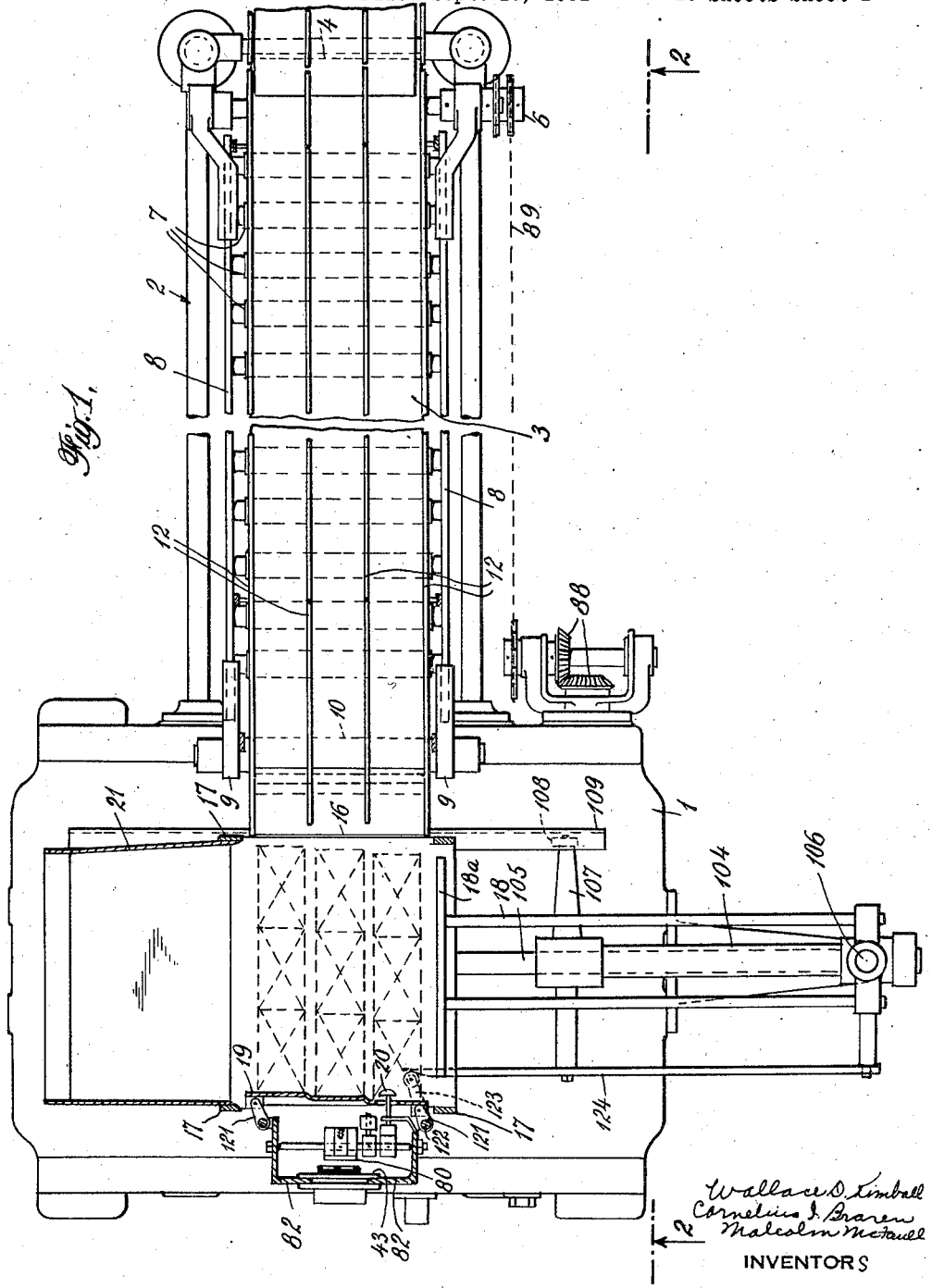

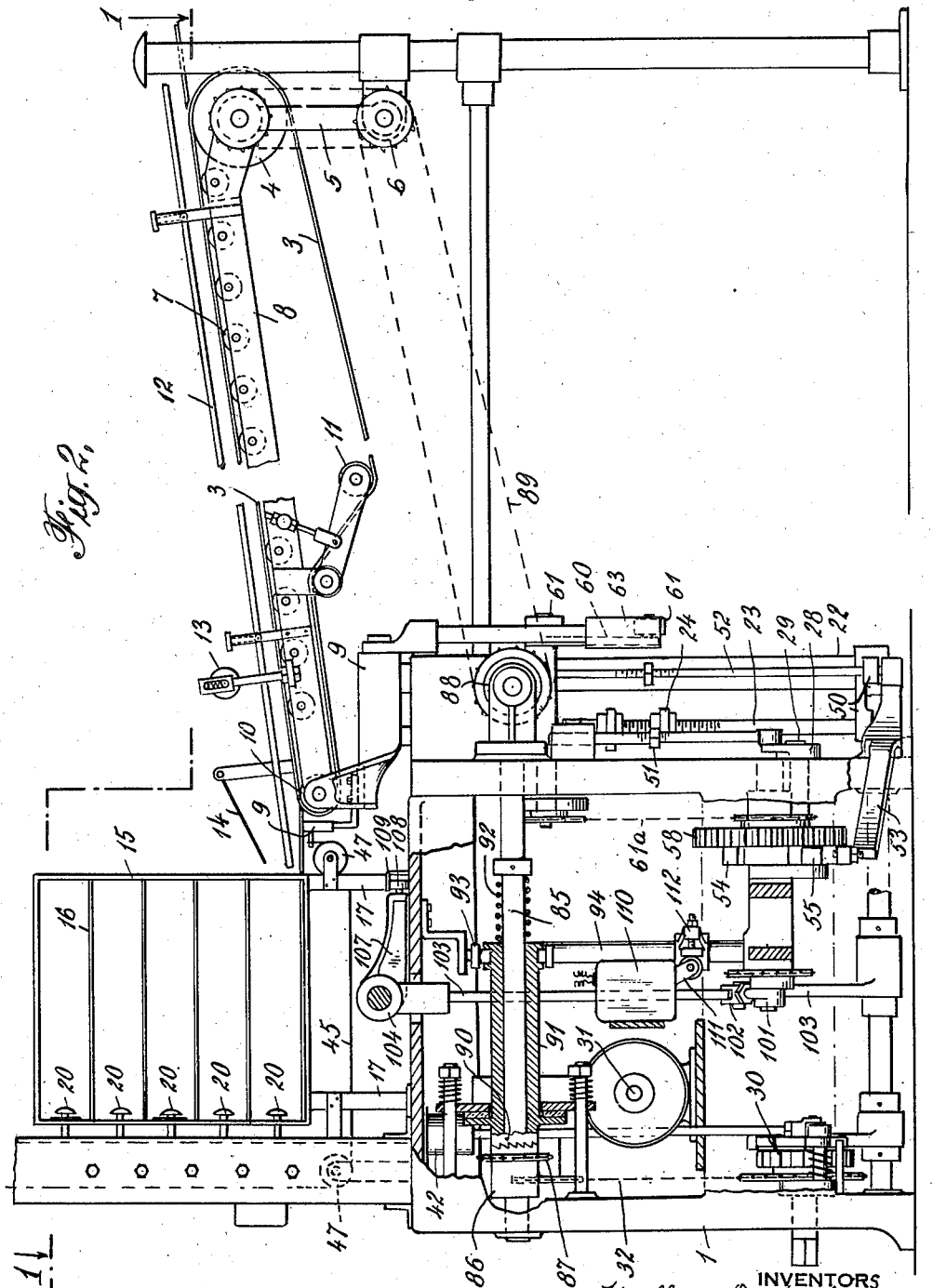

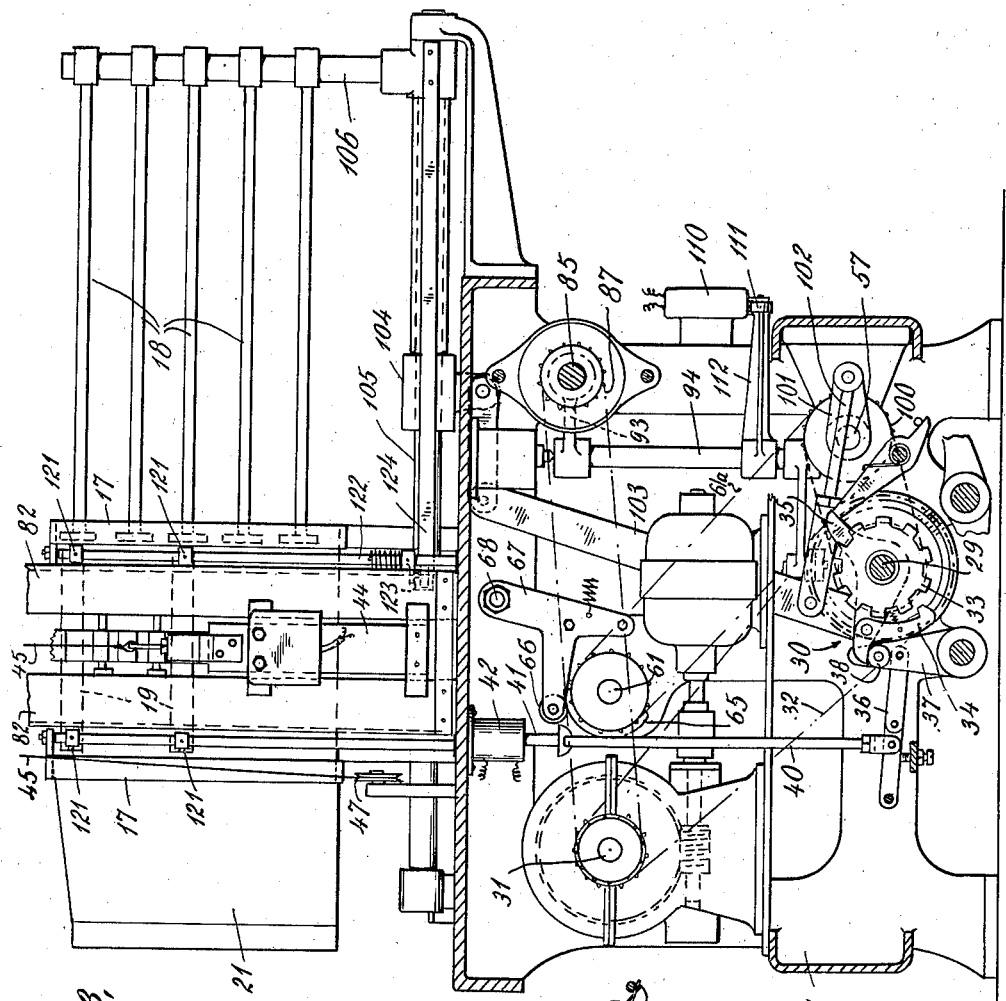

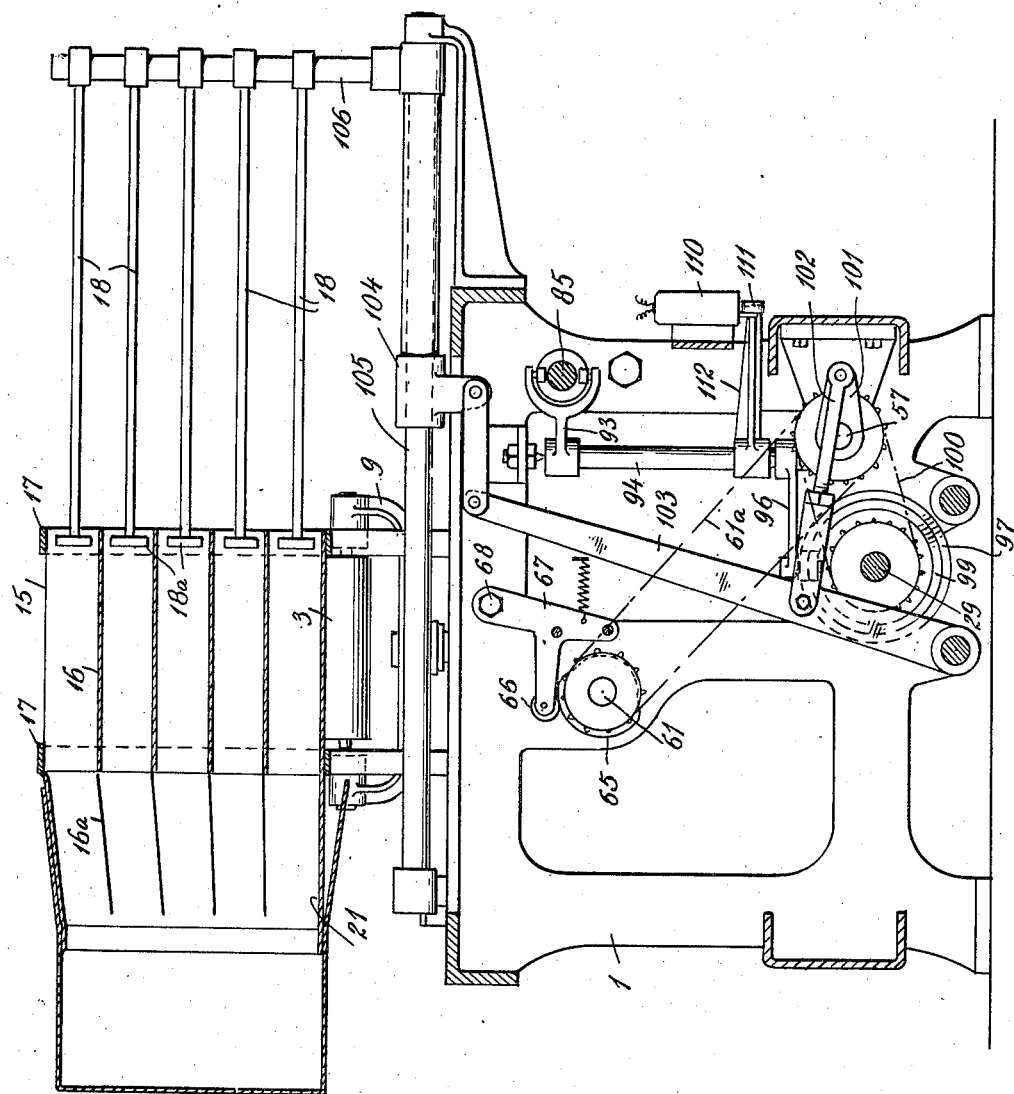

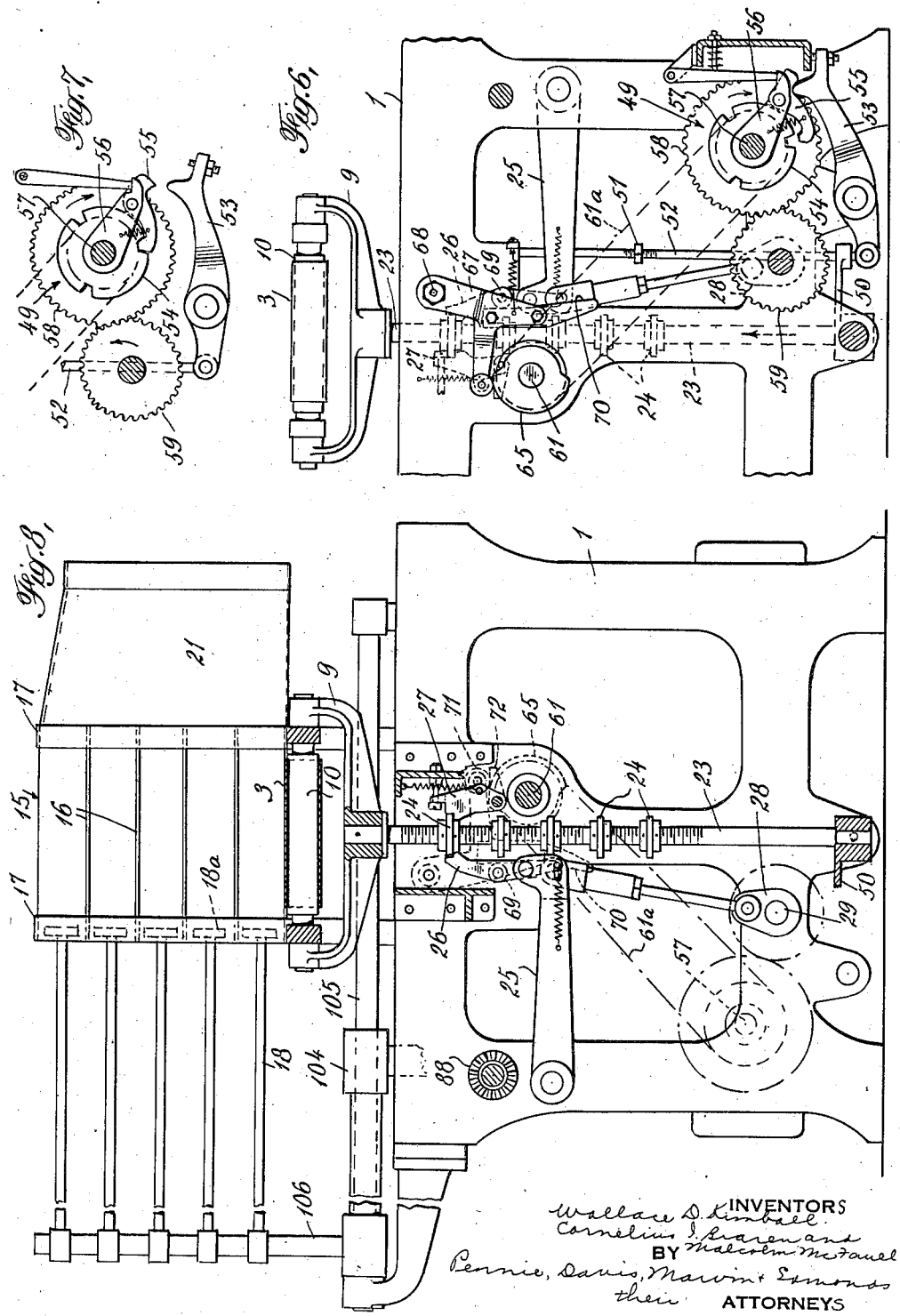

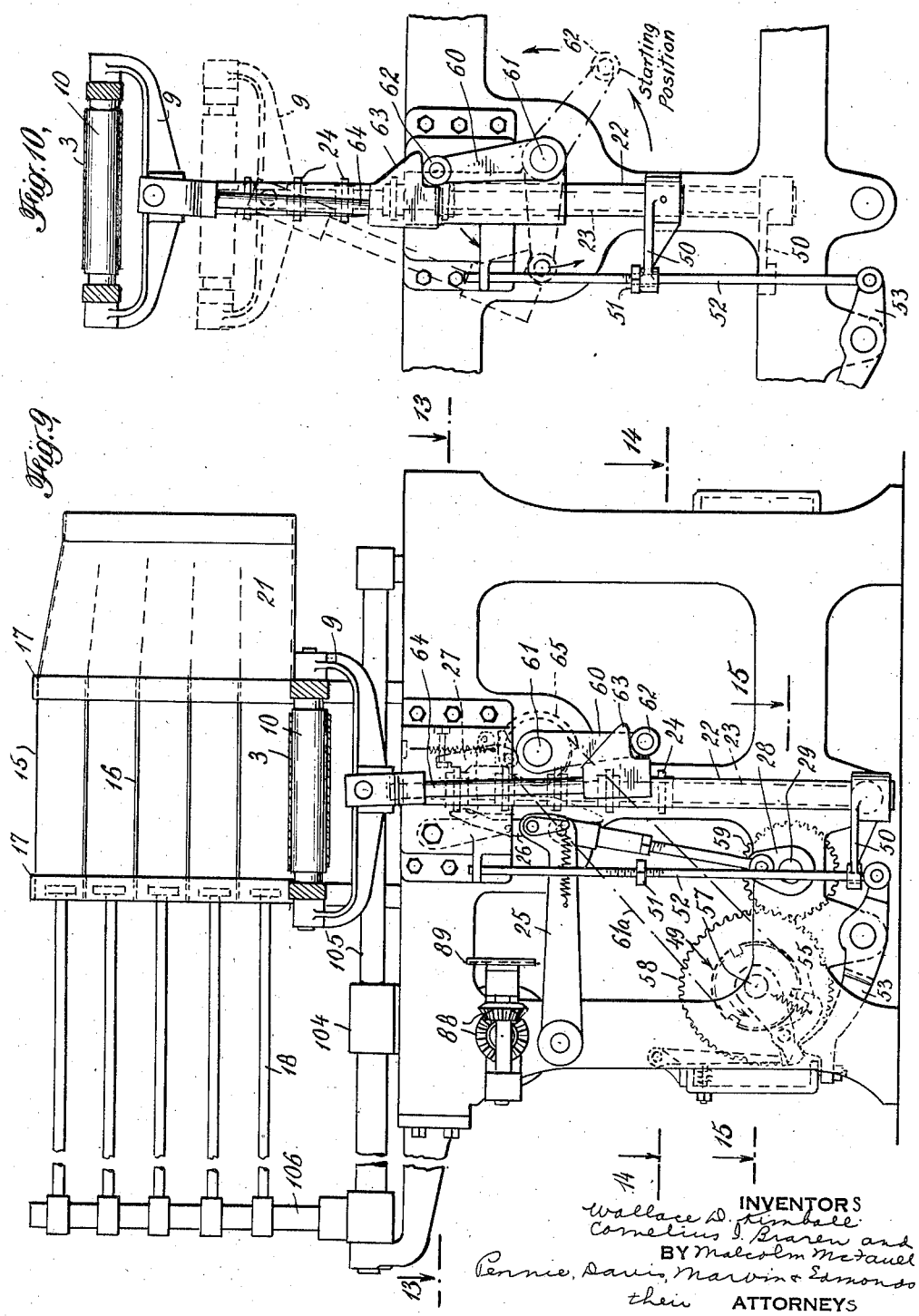

July 14, 1936.  W. D. KIMBALL ET AL  2,047,272
MACHINE FOR PACKING ARTICLES IN BOXES
Filed Sept. 15, 1931  13 Sheets-Sheet 7
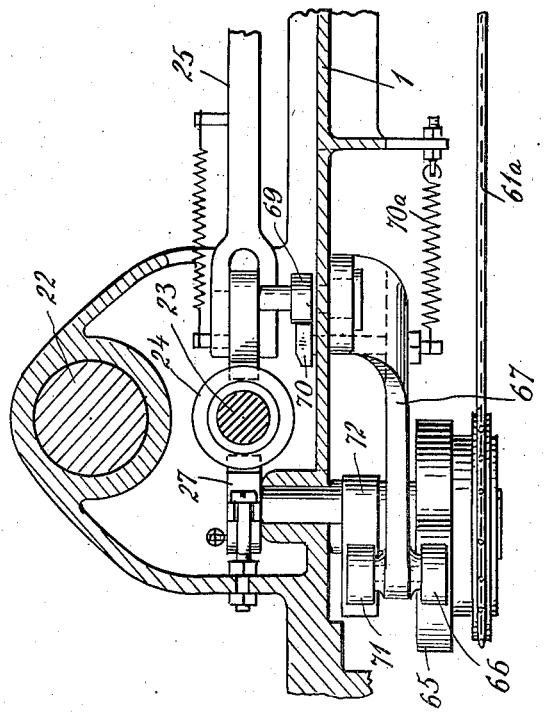
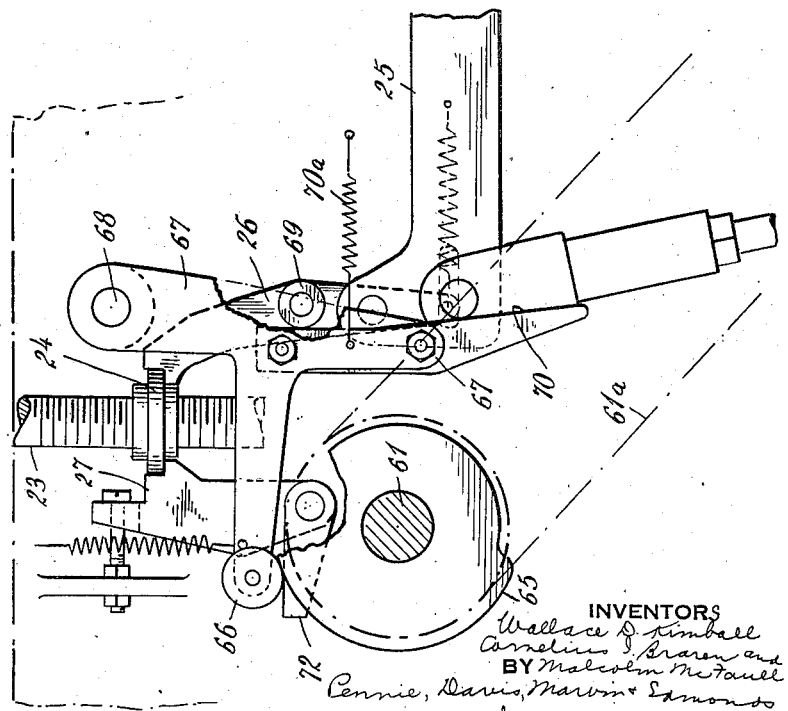
INVENTORS
Wallace D. Kimball
Cornelius J. Braren and
BY Malcolm McFaull
Pennie, Davis, Marvin & Edmonds
their ATTORNEYS

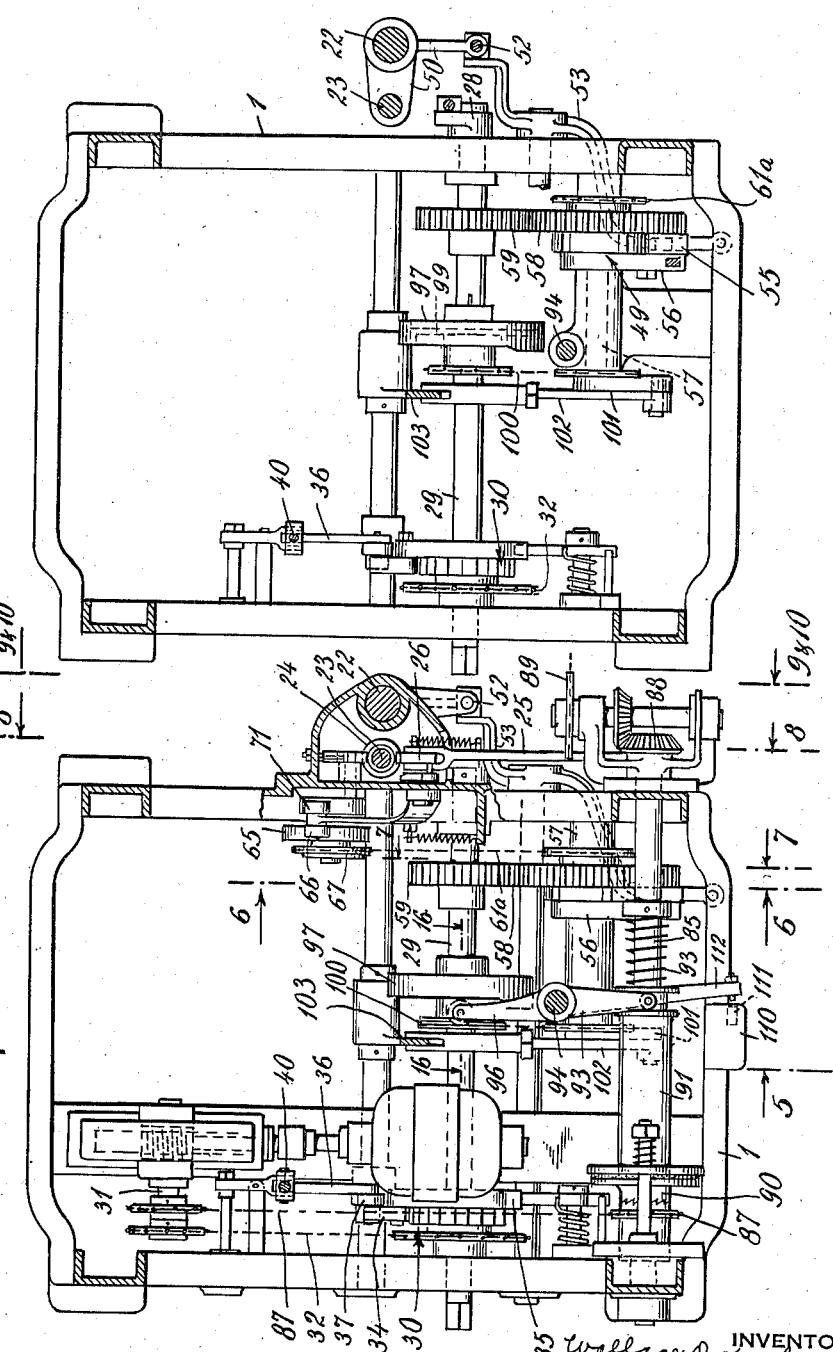

July 14, 1936.   W. D. KIMBALL ET AL   2,047,272
MACHINE FOR PACKING ARTICLES IN BOXES
Filed Sept. 15, 1931   13 Sheets-Sheet 9
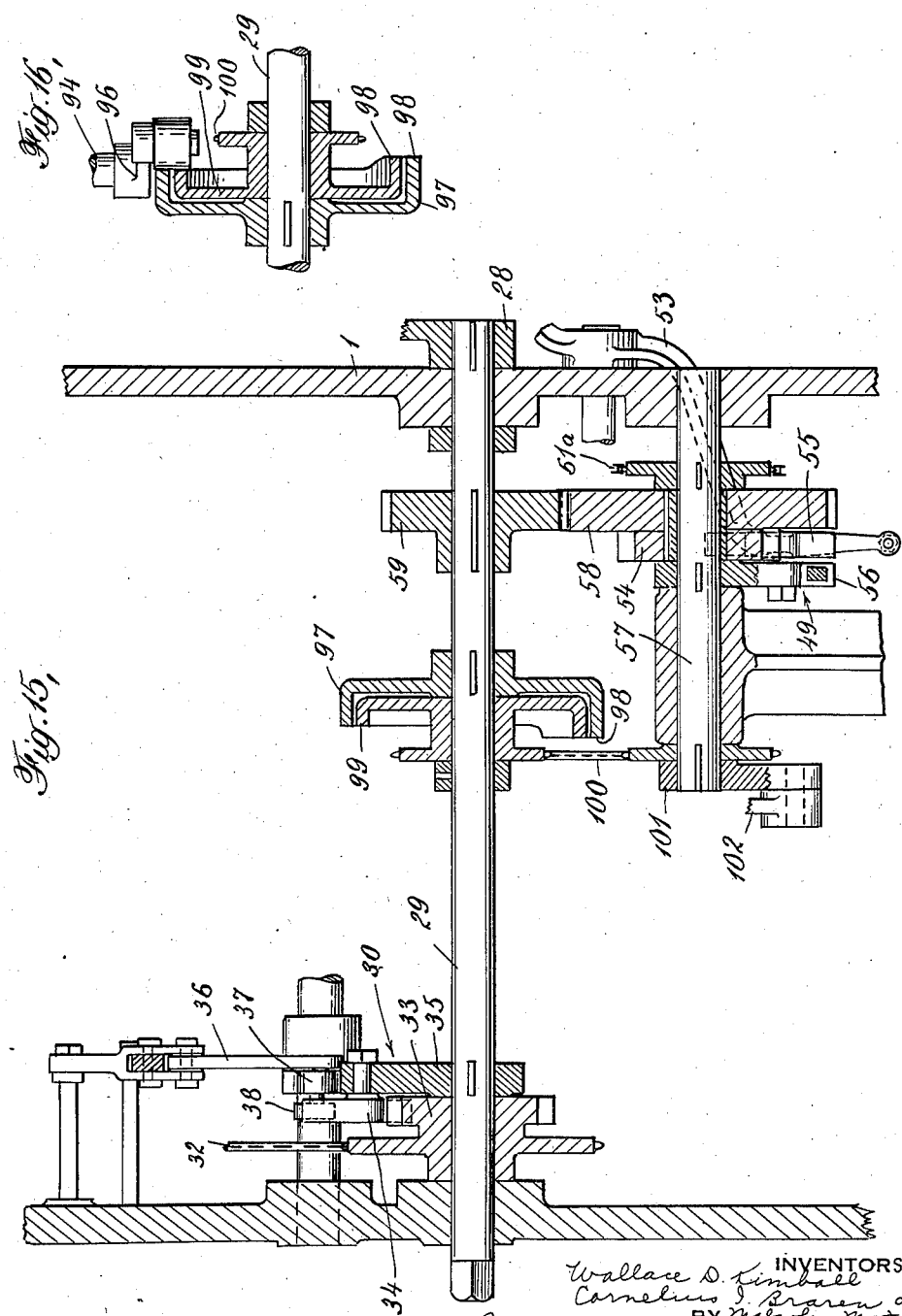

July 14, 1936.   W. D. KIMBALL ET AL   2,047,272
MACHINE FOR PACKING ARTICLES IN BOXES
Filed Sept. 15, 1931   13 Sheets-Sheet 10
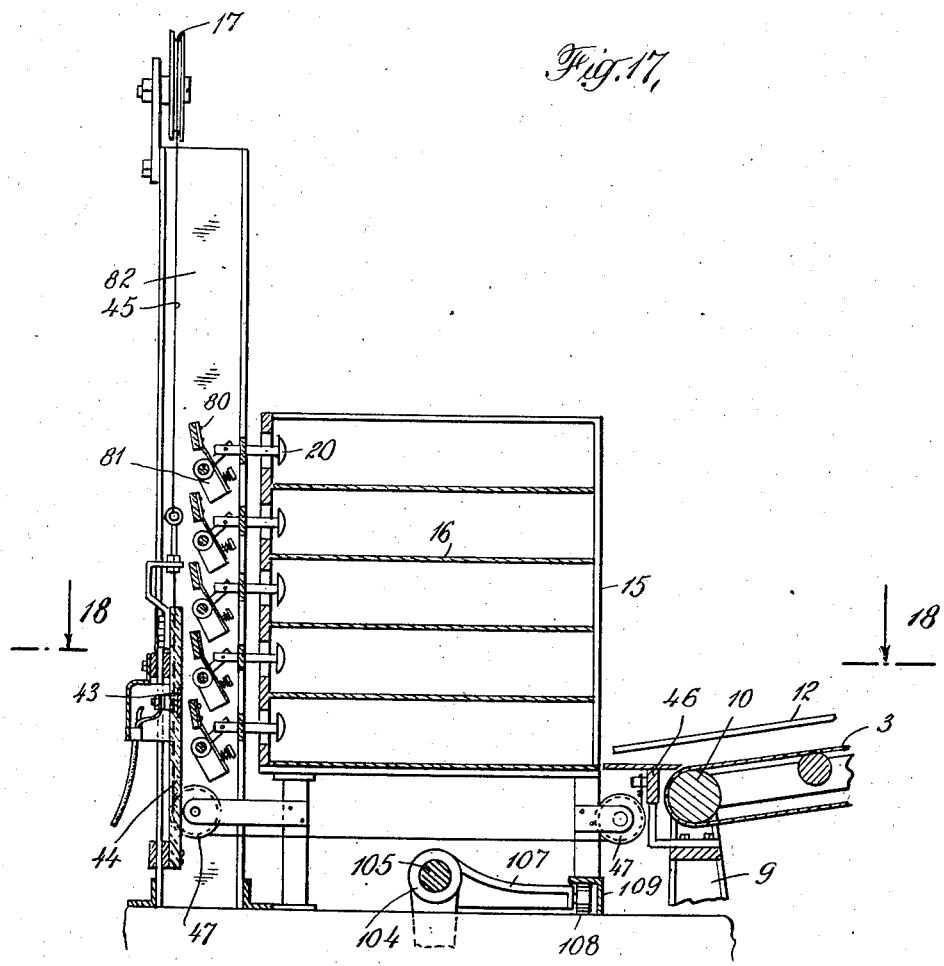
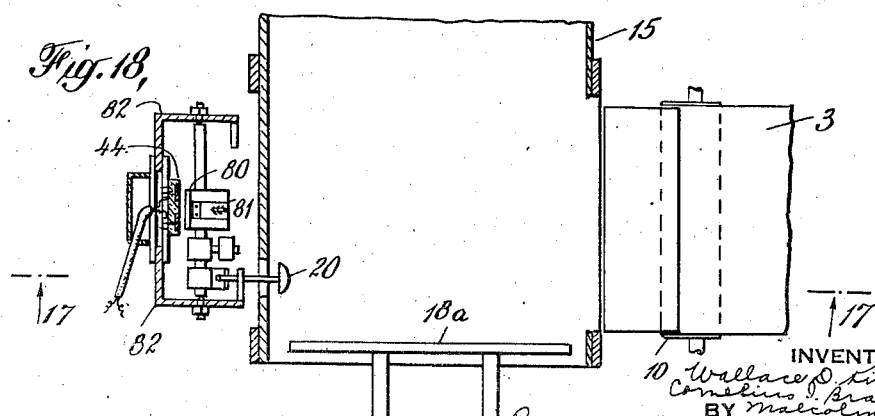

July 14, 1936.   W. D. KIMBALL ET AL   2,047,272
MACHINE FOR PACKING ARTICLES IN BOXES
Filed Sept. 15, 1931   13 Sheets-Sheet 11
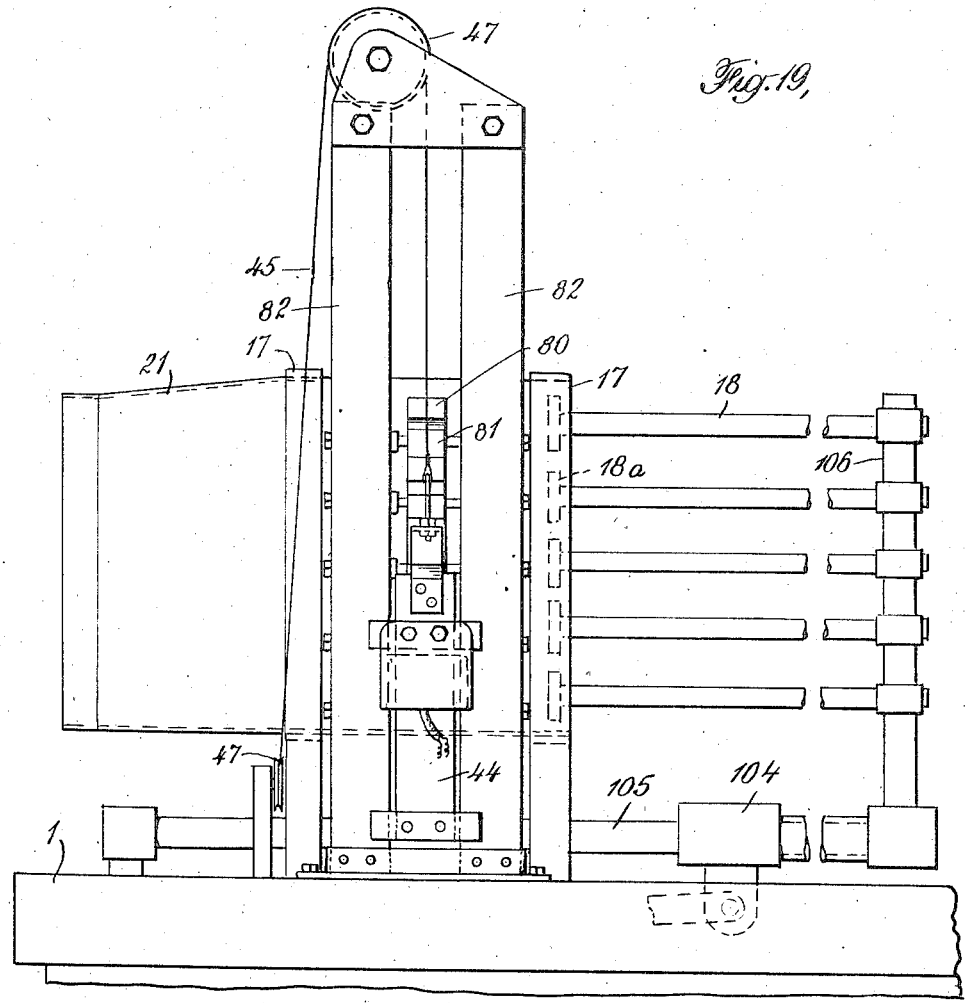
Fig. 19,
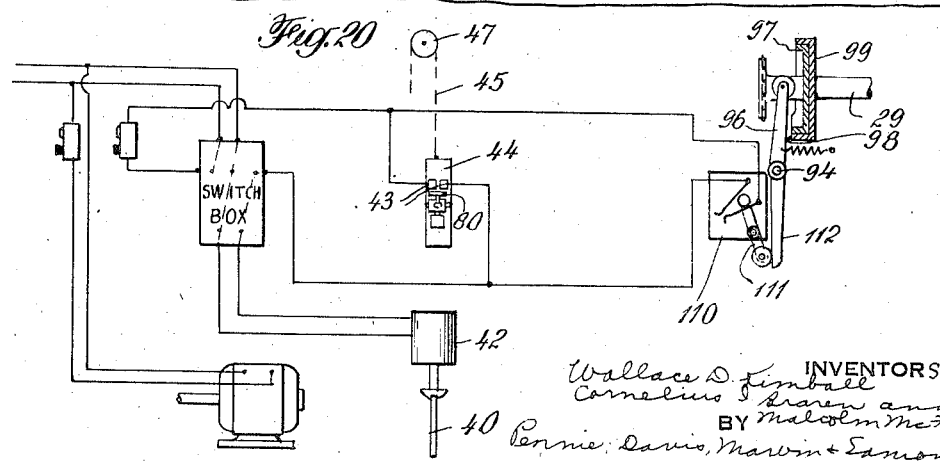
Fig. 20

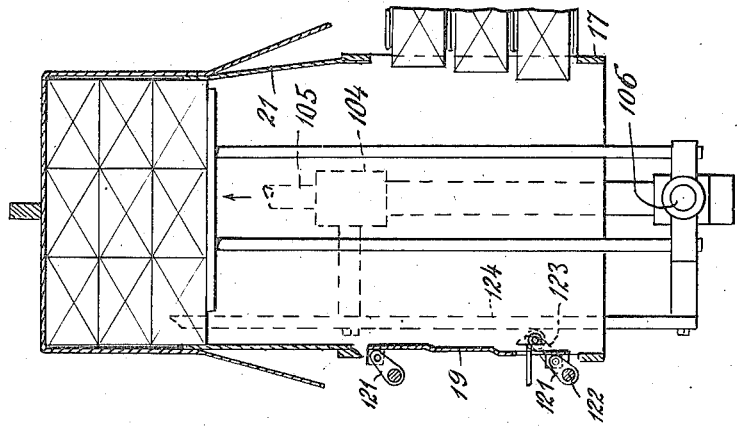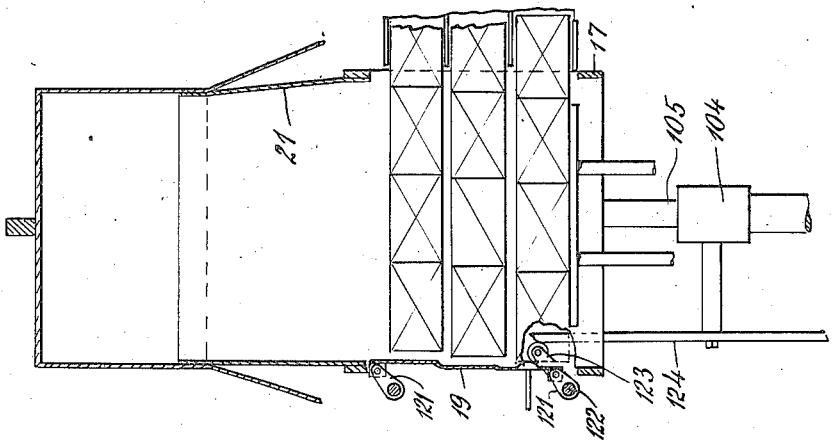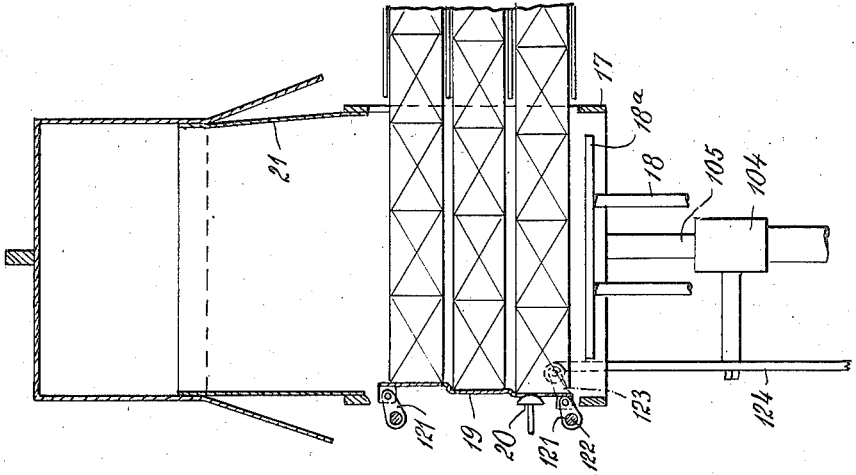

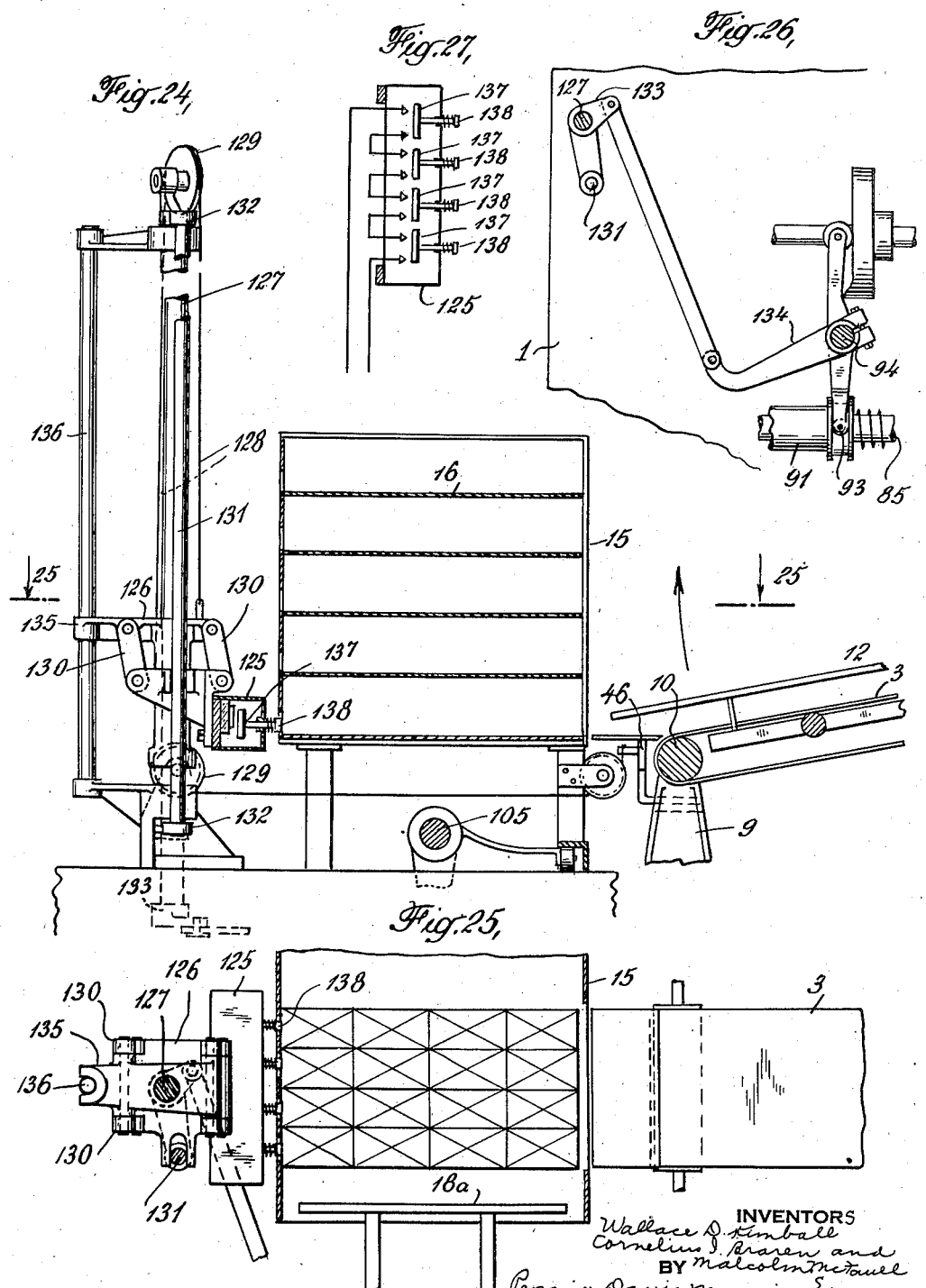

Patented July 14, 1936

2,047,272

UNITED STATES PATENT OFFICE 2,047,272

MACHINE FOR PACKING ARTICLES IN BOXES

Wallace D. Kimball, Jackson Heights, Cornelius I. Braren, Jamaica, and Malcolm McFaull, Jackson Heights, N. Y., assignors to Standard-Knapp Corporation, Long Island City, N. Y., a corporation of New York Application September 15, 1931, Serial No. 562,922

17 Claims. (Cl. 226—14)

This invention relates to machines for packing articles in cartons or packing cases, and has for its object to provide a machine of this class which will successfully handle all kinds of articles of generally rectangular configuration which are commonly shipped in fibreboard or corrugated board cartons. Specific articles of the kind in question are soap, sardine cans and other "square" cans, and particularly small cartons or packages of all kinds of commodities such as cereals, starch, soap powder and the like.

Various machines have heretofore been devised for packing articles of this kind, but until recently such machines have not been in extensive use for the reason that a machine designed to handle one particular commodity was seldom found to be suitable for any other type of commodity, thereby so limiting the field of utility of each particular machine as not to warrant the expense of design and manufacture.

The machine of the present invention is designed to handle all the various kinds of articles above mentioned, and is readily adjustable to articles of different dimensions.

The machine of the present application is specifically an improvement on a modification of the machine forming the subject-matter of our copending application Serial No. 432,181, filed February 28, 1930. The machine of this application and the machine of our prior case have in common the provision of means for grouping together a plurality of articles in superimposed layers to form a charge corresponding in dimensions with the interior of the carton or box to be filled and thereafter projecting the assembled charge into the carton.

In the machine of our prior application the articles to be packaged are brought to the position of assembly by a belt conveyor which discharges them onto a table adjacent the carton supporting devices. As each layer of articles is discharged onto the table, the table is lowered the thickness of one layer of articles, thereby allowing a succeeding layer to be superimposed on the first layer, and so on until the desired number of layers have been brought together to form the charge.

In the machine of our present application the layers of articles are superimposed one on the other on a receiving table, but in this case, instead of lowering the table step by step as the articles are placed thereon, the table is stationary and the conveyor belt is elevated at its discharge end in successive steps corresponding to the thickness of the articles, to thereby, as before, assemble the charge of articles in superimposed layers for insertion as a unit into the carton. This modification of our prior machine has certain advantages under some conditions over the original design as will be hereinafter pointed out.

In the accompanying drawings, we have illustrated a preferred embodiment of our improved machine, and in the said drawings.

Fig. 1 is a plan view of our improved machine, certain parts being in section of line 1—1 of Fig. 2;

Fig. 2 is a vertical sectional view on the correspondingly numbered line of Fig. 1;

Fig. 3 is an end view partly in section looking from the left of Fig. 1;

Fig. 4 is a detail view of the one-way clutch shown in Fig. 3 with the parts in operative position;

Fig. 5 is a vertical sectional view on line 5—5 of Fig. 2 and Fig. 13;

Figs. 6, 7, 8, 9 and 10 are detail views partly in section on the correspondingly numbered lines of Fig. 13, showing the mechanism for raising and lowering the feed conveyor of the machine;

Figs. 11 and 12 are detail views on an enlarged scale of parts of the conveyor-elevating mechanism;

Figs. 13, 14 and 15 are horizontal sectional views on the correspondingly numbered lines of Fig. 9 showing different parts of the driving mechanism of the machine;

Fig. 16 is a detail view of the double cam member forming part of the driving mechanism;

Fig. 17 is a sectional detail view on line 17—17 of Fig. 18 showing the article-actuated control mechanism for initiating the movement of the feed conveyor;

Fig. 18 is a horizontal view on line 18—18 of Fig. 17;

Fig. 19 is an end elevation on an enlarged scale of the electric control mechanism;

Fig. 20 is a diagrammatic view showing the control circuits;

Figs. 21, 22 and 23 are detail views of the carton-charging mechanism showing the parts in different positions of operation; and Figs. 24, 25, 26 and 27 are detail views showing a modified form of control mechanism wherein each individual row of articles actuates its own switch.

Referring to the drawings, 1 indicates the frame of the machine and comprises a table of generally rectangular configuration. The table has an extension 2 projecting from the middle of one side and supporting a conveyor section 3 on which the articles to be packaged are advanced into the machine. The conveyor 3 is a continuously operated belt conveyor and may be of a width to accommodate any desired number of rows of articles, for example three rows, as shown in the drawings. The belt is supported at its outer end, that is, the end remote from the frame 1, by a driving pulley 4 whose bearings are carried at the upper ends of a pair of links 5 extending upwardly from a shaft 6 supported in fixed bearings. The upper reach of the belt upon which the articles rest as they are advanced into the machine is supported by a series of rollers 7 carried by parallel frame members 8 pivoted at their outer ends upon the shaft of the pulley 4. The members 8 are supported at their ends adjacent the frame 1 upon a vertically shiftable carriage 9. The carriage 9 overhangs the top of the table 1 in the manner shown in Fig. 2, the arrangement being such that as the frame 9 is moved up and down by the mechanism hereinafter described, the pulley 10 which supports the inner end of the conveyor is moved up and down above the table in a vertical plane. The outer end of the conveyor supported by the roller 4 is fixed against vertical movement, the links 5, however, permitting sufficient play horizontally to provide for the straight line movement of the pulley 10.

The belt 3 is provided with a belt tightener 11 and extending along the top of the supporting frame over the belt are guide rods 12 for maintaining the articles to be packaged in three separate rows. The belt frame is also provided with an overhanging roller 13 and guide plate 14 for holding the packages in place as they are advanced into the article-assembling frame 15.

The article-assembling frame is stationarily supported on top of the table 1 and comprises a series of shelves 16, here shown as five in number, spaced apart a distance to allow clearance of the articles between the shelves and of an area to support a complete layer of articles. For example, in the machine shown, the shelves or flights or the assembly frame 15 are of dimensions corresponding to nine articles, that is to say, the shelves 16 are large enough to accommodate three rows of three with sufficient space outside the shelves for the four uprights 17 which form the vertical members of the assembly frame to lie without the space occupied by the assembled rows of articles.

Between the uprights 17 the sides of the assembly frame are open on all four sides. The articles are delivered onto the shelves 16 by the belt 3 through one open side of the frame and are ejected through a second open side at right angles to the side of entry by means of a plunger 18. The plunger 18 carries a series of heads 18a, one for each shelf, and is mounted for reciprocation on top of the table 1 to effect the projection of the assembled layers of articles from the assembly frame 15 into the carton supported at the third side of the frame. At this side of the frame the shelves 16 may, if desired, be provided with extensions or flights 16a, as shown in Fig. 5, to better guide the articles into the cartons.

At the fourth side of the frame 15 there is arranged a stepped stop plate 19 against which the articles are fed by the belt 3. This stop plate serves to position the rows of articles with respect to each other so as to provide clearance for the articles on the shelves from those on the conveyor as the articles are ejected from the frame by the plunger 18. Also mounted at the fourth side of the frame and projecting through the plate 19 are a series of movable contact-buttons 20 arranged vertically in line with each other in position to be engaged by the endmost articles in the rows, adjacent the plunger, as shown more particularly in Fig. 1. These contact members serve to initiate the operation of the mechanism for lifting the cross head 9 which supports the free end of the feed belt and has for its purpose to elevate the feed belt to project a second layer of articles in the machine only when the preceding or underlying layer is complete.

It will be understood that the machine of the present application is designed to be used in conjunction with an article-assembling machine such as shown in the co-pending application of Cornelius I. Braren, Ser. No. 501,512, filed December 11, 1930, wherein the articles to be packaged are received from the labeling machine or other machine which performs the final operation for the article, are grouped together in rows of three each and advanced toward the packaging unit as separate rows, each row consisting always of three articles.

When the contact-button 20 of the first layer of articles is shifted to close the contact, which takes place when three rows of articles have been projected onto the first shelf 16 of the assembly frame, the operating mechanism of the cross head 9 is set in motion to thereby raise the cross head a distance corresponding to the distance between the shelves 16 and thereby bring the feed belt opposite the second shelf. The mechanism for operating the cross head 9 is designed to come to rest at the completion of each upward step in its movement and remain at rest until the next movable contact-button 20 is operated by the advance of the articles into the frame to again close the contacts and effect the second upward step in its movement. When, however, the topmost movable contact-button 20 is shifted to close the circuit mechanism is set in operation to effect the lowering of the cross head to its bottom position to thereby bring the belt in line with the lowermost shelf of the assembly frame. At the same time the mechanism for operating the plunger 18 is set in motion to thereby eject the assembled articles from the assembly frame 15 the carton which in the meantime has been placed by hand over the funnel 21 supported in fixed position alongside the assembly frame, as will be clear from Fig. 1. At the completion of the movement of the plunger 18 the plunger-actuating mechanism will again remain at rest until a further complete charge of articles has been assembled, when it will be again actuated to deliver an entire charge into the next carton placed upon the funnel.

The articles will be delivered onto the belt 3 from the assembling machine of the above-mentioned co-pending application in rows of three, but if the plant is not working to capacity the rows will be separated by varying distances depending upon the rapidity with which the articles are delivered to the assembling machine. The mechanism of this application is designed to receive such irregularly advanced rows of three and place them in complete layers in the cartons. The machine will not operate to discharge the assembled articles into cartons until the final complete layer has been positioned on the top shelf of the frame.

The mechanism for operating the cross head 9 is illustrated primarily in Figs. 6–12. The cross head 9 is supported on the top of a vertical rod or column 22 mounted in suitable bearings in the machine frame. Also carried by the cross head is a second vertically depending column 23 by means of which the cross head is lifted through the medium of spaced collars 24 adjustably attached to the column 23. For elevating the rod 23 there is provided a rock arm 25 whose free end carries a pawl 26 adapted to engage under the successive collars 24 on the rod 23 and elevate the rod on each upward movement of the free end of the rod 25 through a space at least equal to the distance between the columns whereby on the return or downward movement of the arm 25 the collar just engaged by the pawl 26 will be caught by a fixed pawl 27 to thereby maintain the cross head in the position to which it has been elevated by the movement of the arm 25.

The rock arm 25 is operated by means of a crank 28 mounted on the shaft 29 and operated intermittently through one complete revolution by means of a stop clutch 30 illustrated in detail in Figs. 3 and 4.

The clutch 30 comprises a driving sprocket loose on the shaft and driven continuously from the main shaft 31, the sprocket and its driving chain being indicated in dot-and-dash lines 32 in Figs. 3 and 4. Attached to the sprocket 32 is a continuously driven toothed wheel 33 into engagement and co-operating with the toothed wheel is a pawl 34 carried by an arm 35 fast to the shaft 29. The pawl 34 is controlled by means of a toggle 36 and a rock arm 37 carrying a roller 38 which, when the toggle is bent as illustrated in Fig. 4, is withdrawn from engagement with the pawl 34 to thereby allow the teeth of the pawl to project into the path of the teeth of the disk 33. When the toggle is straightened the roller 38 is projected into the path of the projecting end of the pawl to thereby engage the pawl and withdraw it from engagement with the teeth of the disk 33 and stop the rotation of the shaft 29. A backlash stop is provided to hold the shaft against reverse movement when it is brought to rest by the engagement of the end of the pawl 34 with the roller 38.

The movement of the toggle is effected through a rod 40 carrying at its upper end a core 41 of a solenoid 42, the circuit through which is closed by the movement of the contact-buttons 20. When the circuit is open the weight of the core 41 serves to straighten the toggle to the position shown in Fig. 3 to thereby hold the pawl out of engagement with the toothed disk 33. When the circuit is closed the solenoid raises the rod 40, thereby breaking the toggle and allowing the pawl to engage the toothed disk. The rotation of the shaft 29 serves to raise the cross head 9 through the crank 28 shown in Fig. 8 and previously described, and means are provided whereby the movement of the cross head serves to immediately break the circuit through the solenoid to thereby straighten the toggle and stop the rotation of the shaft 29 at the completion of a single revolution. To this end the contacts 43, through which the circuit is closed by means of the buttons, are carried by a vertically shiftable plate 44, which plate is connected by a cable 45 to a bar 46 (see Fig. 2) fixed on the cross head 9, the cable being trained over a series of pulleys 47 so that the plate 44 will be elevated with the cross head 9 and thus break the circuit through the solenoid when the cross head has been partially elevated.

At the completion of each upward step in the movement of the cross head the contacts 43 will come to rest opposite the next button 20 in position for the circuit to be closed and the operation repeated when a full layer of articles has been assembled on the next shelf 16. The details of the contact mechanism are shown in Figs. 17, 18 and 19. Each article operated contact consists of a metal plate 80 spring-supported on a rocker 81 carried by a shaft extending between two upright frame members 82. The button 20 of each contact is guided for horizontal movement in one of the frame members 82 and is loosely pivoted to the rocker 81 which is weighted so as to normally hold the button in projected position and the plate 80 away from the contacts 43. The carriage 44 for the contacts 43 is mounted for vertical movement on the flanges of the uprights 82 and consists primarily of a sheet of insulating material in which the contacts 43 are imbedded in spaced relation so as to be bridged by the plate 80 when the buttons are pressed outwardly by the articles on the shelves 16.

As stated above, means are provided to lower the cross head after the complete number of layers have been assembled in the frame 15. This movement is accomplished by means of a pawl clutch 49, the parts of which are brought into driving engagement through a trip arm 50 carried by the lower end of the column 23 carrying the spaced collars 24. This trip arm 50 (see Figs. 9 and 10) is positioned to engage a collar 51 carried by a rod 52 which is mounted for vertical movement in a suitable guide carried by the machine frame and is attached at its lower end to a lever 53 (see Fig. 6) whose free end extends into a position to be projected into the path of movement of the projecting end of the pawl 55 constituting the driven member of the clutch 49. The pawl is carried by an arm 56 attached to the shaft 57 supported within the machine frame adjacent the shaft 29.

The driving member of the clutch 49 comprises a notched disk 54 and a gear 58 driven from the shaft 29 by means of a gear 59 attached to that shaft. Thus the gear 58 is rotated only when the shaft 29 is rotated and the shaft 57 is rotated only when the cross head has been elevated to its uppermost position and the trip lever 54 shifted by means of the rod 52 to release the pawl 55 and thereby permit the parts of the clutch 49 to be brought into engagement.

The mechanism for lowering the cross head comprises a crank arm 60 (see Figs. 9 and 10) attached to a shaft 61 extending transversely of the machine frame alongside the column 23, the shaft 61 being rotated from the shaft 57 through the medium of a sprocket chain 61a. The parts are so designed that the shaft 57 and with it the shaft 61 will be given one complete revolution each time the cross head 9 is elevated to its topmost position. This complete revolution, however, is not in synchronism with the revolution of the shaft 29, but occurs during two rotations of the shaft 29, which shaft is given two consecutive rotations without interruption at the completion of the upward movement of the cross head.

The crank arm 60 carries at its outer end a roller 62 which in the uppermost position of the crank arm shown in Fig. 10 engages beneath a shoe 63 and at the lower end of a pivoted rod 64 depending from the cross head. This is the normal inoperative position of the crank arm and as the cross head 9 is elevated to its topmost position the inclined upper face of the shoe 63 will cause the rod 64 to swing aside to allow the shoe to engage over the roller 62. As the arm 60 commences its rotation the pawls 26 and 27 are released so that the cross head is supported only by the shoe 67 and is thereby lowered by the continued movement of the crank arm 60, as will be clear from Fig. 10 wherein the successive positions of the parts are indicated in dotted lines. During the downward movement of the cross head the pawls 26 and 27 are shifted out of engagement with the collar 24 and are held out of the path of movement of the collars so as not to interfere with the downward movement of the cross head.

The mechanism for releasing the pawls consists of a cam 65 attached to the shaft 61, this mechanism being shown in enlarged detail in Figs. 11 and 12. The raised portion of the cam 65 is positioned to clear its co-operating roller 66 at the beginning of the rotation of the shaft 61 to thereby release the pawl before the arm 60 has moved appreciably. This roller 66 is supported on the end of a rock arm 67 pivoted on the machine frame at 68. Attached to the depending end of the rock arm in position to be engaged by a roller 69 carried by the pawl 26 is a cam 70 of a length somewhat greater than the up and down movement of the pawl 26. The face of the cam 70 normally lies out of engagement with the roller 69, but when the arm 67 is rocked by its spring 70a when released by the cam 65 the surface of the cam 70 is projected into the path of movement by the roller 69 so that on the descending movement of the pawl 26 the roller will engage the cam track 70 and move the pawl 26 out of engagement with the collar 24.

In order to simultaneously release the pawl 27 so that the cross head 9 may descend with the crank 62 the rock arm 67 is provided with a second roller 71 (see Fig. 12) overlying an arm 72 on the pivot of the pawl 27. Hence as the rock arm 67 is actuated to project the cam 70 into the path of the roller 69 carried by the pawl 26, the roller 71 will press downwardly on the arm 72 and thereby release the pawl 27.

The pawls 26 and 27 are held open throughout the completion of the movement of the crank arm 60, which occurs when the crank pin and roller 62 have been brought to their lowermost position as shown in Fig. 9. On its further rotation to its normal inoperative position the arm 60 will move away from the shoe 62 leaving the cross head in its lowermost position with the belt in registry with the bottom shelf of the assembly frame. When the shafts 57 and 61 have made one complete rotation the pawl of the clutch 49 will again come into engagement with the trip lever 54, thereby disengaging the clutch and stopping the rotation of the shafts 57 and 61. When the cross head 9 has been brought to its lowermost position the continued rotation of the shaft 61 and the cam 65 will elevate the free end of the rock arm 67 to thereby release the pawls 26 and 27, and the parts will be in position to resume the step-by-step upward movement of the cross head under the control of the switch buttons 20.

To prevent damage to the articles during the movement of the cross head 9 from one shelf to the other of the assembly frame it is desirable to momentarily stop the movement of the feed belt 3. To this end the drive shaft 6 for the feed belt is driven from the main shaft 31 through the medium of a ratchet clutch carried by a shaft 85 extending in parallelism with the main shaft 31 at the side of the machine away from the carton-supporting funnel, that is, at the right of the machine as shown in Fig. 3, beneath the feed plungers. The driving member 86 of this clutch (see Fig. 2) is continuously driven through sprocket 87 from the main shaft 31, and when the clutch is in engagement serves to continuously drive the shaft 85, which in turn through the beveled gears 88 and sprocket chain 89, drives the shaft 6 for operating the feed belt.

The driven member 90 of the clutch is carried at the end of a sleeve 91 which is keyed to the shaft 85 and is normally held in engagement with the driving member of the clutch by a spring 92. The clutch is disconnected by shifting the sleeve longitudinally of the shaft 85 by means of a fork 93 carried by a vertical rock-shaft 94 (see Fig. 5) which is operated periodically in synchronism with the cross head operating mechanism to disconnect the clutch.

The mechanism for operating the rock-shaft 94 comprises an arm 96 attached to the rock-shaft 94 near the bottom and provided at its outer end with a roller for engagement with a cam 97 fast to the shaft 29 which, as previously described, is operated through the stop clutch 30 to periodically elevate the cross head 9.

The cam mechanism is shown in enlarged detail in Figs. 15 and 16, and as will be there noted, the cam 97 is a crown cam having a projection 98 which serves to rock the shaft 94 to release the ratchet clutch and hold it open to stop the movement of the feed belt while the cross head 9 is beginning its movement. To effect an immediate stoppage of the feed belt when the clutch is released a friction brake 83 is provided as shown in Fig. 2, the two members of the brake being pressed together by the movement of the sleeve 91 which releases the clutch.

During the downward movement of the cross head the belt 3 is held stationary for a longer period than necessary during the upward steps of its movement. To this end the rock shaft 94 is periodically rocked by a second cam 99 driven from the cross head lowering mechanism. This second cam 99 is enclosed within the cam 97 and operates on the same cam roller. The cam 99 is loose on the shaft 29 and is driven through a sprocket 100 from the shaft 57 of the stop clutch 49 which operates the cross head lowering mechanism previously described. The length of the cam face of cam 99 and its period of engagement with the roller of the arm 96 is such that the feed belt 3 is stopped during the lowering movement of the cross head 9 and until the plungers 18 have been withdrawn from the assembly frame.

The plunger 18 for shifting the assembled articles into the carton is operated in synchronism with the cross-head-lowering mechanism and through the same stop clutch. This mechanism is shown particularly in Fig. 5 and comprises a crank 101 carried by the end of the shaft 57 and connected by a link 102 with the lever 103 which is in turn connected with the plunger carriage 104.

The plunger carriage as shown in Fig. 5 comprises a sleeve mounted for reciprocating movement on a guide rod 105 extending across the top of the table and carrying at its outer end an upright 106 to which the several plungers 18 are attached. To prevent turning of the plunger carriage about its guide rod there is provided an arm 107 projecting laterally from the plunger carriage and having at its outer end a roller 108 which extends under a guide track 109 on the table top.

The amplitude of movement of the plunger as well as the downward movement of the cross head is so much greater than the step-by-step upward movements of the cross head that a greater interval of time must be allowed for these operations than is necessary for each step in the upward movement of the cross head. To this end means are provided for causing the stop clutch 30 to remain in engagement for two complete revolutions at the completion of each charge. Otherwise stated, if the complete movement of the plunger and the lowering of the cross head took place in the same interval of time as one upward step of the cross head, the machine would have to be operated at a slower speed than would otherwise be necessary, but by allowing a double interval of time at the completion of each charge, the machine may be operated at a higher speed and consequently have a greater capacity.

The mechanism for causing the clutch 30 to remain closed through two revolutions comprises a switch 110 in shunt circuit around the switch which is operated by the buttons and which normally controls the operation of the solenoid 42, as will be seen in the circuit diagram, Fig. 20. This switch, as shown in Fig. 20, comprises two spaced contact arms and a ratchet 111 which is periodically shifted by means of an arm 112 carried by the rock-shaft 94 to connect the contacts and close the circuit. During the intermediate steps in the operation of the machine the opening and closing of the switch 110 has no effect on the operation of the clutch, for the reason that the period that it is closed occurs only when the clutch 30 is in operation, the rocker being shifted into position to open the switch before the completion of the normal one revolution of the clutch 30. At the completion, however, of the charge, the inner cam 99 will hold the rock-shaft in its operative position for a longer period than the normal one revolution of the clutch 30 and will thereby hold the switch 110 closed so that the solenoid will remain energized, and when the clutch 30 completes its single operation the toggle will remain broken as shown in Fig. 4 so that the pawl 35 will not engage the stop arm 37 and the shaft 29 will continue in rotation.

In this connection it will be noted that the gears 58, 59 through which the driving disk of the stop clutch 49 is driven from the shaft 29 having a ratio of 1½:1. That is to say, for each complete rotation of the shaft 29 through the medium of the stop clutch 30 the driving disk of the stop clutch 49 will be given two-thirds of a single rotation, and for two complete revolutions of the shaft 29 which takes place at the completion of each charge, the driving disk will be rotated through one and one-third revolutions. The driven shaft 57 of the clutch is, however, operated through one complete revolution during each cycle due to the fact that the driving disk has three driving notches and when the clutch 49 is reengaged the pawl will not engage the tooth from which it was disengaged at the completion of the preceding cycle because the disk continues its rotation until the clutch 30 is disengaged which takes place after the disengagement of the clutch 49. The pawl therefore at each operation engages the notch immediately behind the notch disengaged at the completion of the preceding operation. The rotation through one and one-third revolutions of the driving member of the clutch will cause the driven member to revolve through a complete revolution and no more, thereby leaving the plunger always at its fully withdrawn position and the cross-head-lowering arm at its lowermost position as shown in Fig. 9.

In order to prevent the articles in the outermost row of the assembled charge catching against the articles remaining on the conveyor 5 as the charge is thrust into the carton by the operation of the plunger, the stepped guide plate 19 previously referred to is provided at the side of the assembly frame opposite the feed belt 3. This guide, as shown in Figs. 21, 22 and 23, is supported on parallel links 121 so that it may be withdrawn from contact with the articles to permit their free movement into the carton during the movement of the plunger. To this end the vertical shaft 122 which supports the links 121 at the side adjacent the plunger is provided with a cam arm 123 adapted to be engaged by a cam plate 124 carried by the plunger carriage 104. The cam 124 engages the roller just before the plunger engages the articles, and as the feed belt 3 has been stopped in the meantime by the mechanism previously described, the articles will be free of restraint and will be shifted by the plunger into the carton without injury through rubbing on the adjacent articles or the adjacent side of the assembly frame.

The operation of the machine as a whole will now be described. The machine is provided with hand controlled switches as shown in Fig. 20, for both the starting motor and the solenoid 42.

The articles to be packaged are delivered to the feed belt 3 in groups of three constituting a single row across the feed belt. Before the articles reach the frame 15 the machine will be started by means of the hand switch. The groups of three articles may follow in irregular sequence depending upon the continuity of operation of the assembling machine of co-pending application Serial No. 501,512, filed December 11, 1930. All parts of the machine except the feed belt will be idle until sufficient groups of three have been advanced onto the bottom shelf of the assembly frame to form a complete layer. As here shown, three rows of three articles each constitute a complete layer, but this number of course may be varied to any desired extent. When the complete layer of articles has been assembled on the bottom shelf and another row of articles has been brought forward by the feed belt with sufficient force to press the layer of articles against the button 20 of the control switch at the bottom shelf, the solenoid 42 will be energized, thereby lifting the core of the solenoid, breaking the toggle 36 and releasing the pawl of the stop clutch 30. The continuously driven member 33 of the clutch will thus be engaged by the pawl and the shaft 29 will be given one complete revolution.

During this one complete revolution the crank 28 will operate to lower the pawl 26 to a position beneath the second collar of the shaft 23 and on its upper stroke the pawl will lift the cross head 9 to a position for the fixed pawl 27 to engage under the second collar and hold the cross head in alignment with the second shelf of the assembly frame. During this movement the cam 97 which is also carried by the driven shaft 29 of the stop clutch 30, will make one complete revolution and, through its cam projection 98, will operate the rock-shaft 94 to stop the feed belt during the necessary interval for the articles carried by the belt not to engage under the second shelf of the assembly frame.

At the completion of the single rotation of the shaft 29 the cam projection 98 will have moved out of engagement with the rock arm 96, thereby allowing the clutch to become re-engaged so that the feed belt will immediately deliver articles to the second shelf of the assembly frame. This sequence of operations will be repeated until the cross head has been elevated to its uppermost position and a complete layer of articles has been assembled on the top shelf of the assembly frame and the switch button 20 for that shelf has been shifted to break the toggle and again set the machine in motion.

As the cross head 9 is elevated to its uppermost position the trip arm 50 at the bottom of the column 32 will have engaged the collar 51 on the operating rod 52 of the stop clutch 49, thereby shifting the stop arm 53 out of engagement with the pawl 55 of the clutch 49 so that the stop clutch 49 will be engaged and ready to impart rotation to the shaft 57 as soon as the shaft 29 is again rotated. The rotation of the shaft 29 will commence as soon as the solenoid has been energized through the topmost switch button to break the toggle.

The first effect of the rotation of the shaft 57 at this period of the cycle of operations is to rotate the sprocket of the chain 61a which in turn operates the shaft 61 carrying the cam 65 through which the pawls 26 and 27 are disengaged from the collar 24 of the column 23. As the movement of the shaft 29 continues the cross-head-lowering crank will commence its movement from its normal position shown in Fig. 10 in the direction of the arrows, to thereby lower the cross-head without shock to its bottom position shown in Fig. 9. During this movement of the drive shaft 57 of the clutch 49, the plunger 18 will be reciprocated through the mechanism described thereby shifting the articles forming the charge into the carton on its forward stroke and returning to its normally outer position. Also during this movement the cam 99 will be rotated to hold the rock-shaft 94 in its operative position for a longer period than otherwise to thereby maintain the circuit closed through the solenoid and also to maintain the clutch 85 of the feed belt open so that the feed belt will not be driven until the cross-head has been returned to its lowermost position ready to deliver the first layer of the next succeeding charge to the bottom shelf of the assembly frame.

It will also be understood that during the period that the charge is being assembled in the frame the attendant has placed a carton over the funnel ready to receive the assembled charge.

One advantage of our improved machine is that it is entirely automatic and will always place a full charge in the carton no matter how irregular the feed of articles to the machine. Another important advantage is that the machine may be operated at a faster speed (reckoned in number of articles packed per minute) than any other machine on the market. One reason for this is that there is no rubbing or scuffing of the articles against each other during the operation of the machine. The shelves 16 (together with the flights 16a, if they are used) keep the layers separate until the charge is assembled and being shifted as a unit into the machine.

Although the machine is entirely automatic it is nevertheless substantially fool-proof in operation. There is but one article-controlled part on the machine, namely, the solenoid 40. All other parts are positively operated by direct mechanical connections from the main shaft through the single electrically controlled clutch.

Another important advantage of our machine is that it requires but little adjustment to adapt it to articles of widely different size. Packing cartons are now made principally in a few standard sizes and a change in the dimensions of the article packed usually means a change in the number of articles making up the charge. It is only necessary to change the number and position of the collars 24 on the column 23, and, of course, the plungers 18 and shelves 16, to vary the number of layers of articles in the charge. No change except in the position of the article guides is required to vary the number of articles in the layers, and no change at all is required in the plunger-operating mechanism of the cross-head-lowering mechanism because of a change in the size of the articles. These mechanisms are operated when the cross-head reaches its topmost position, irrespective of the number of steps required to bring it to that position.

In Figs. 24 to 27 we have illustrated a modified form of mechanism wherein the individual rows of articles directly operate separate control switches to thereby insure a complete charge of articles for each carton, even though the articles are fed to the machine in incomplete groups.

Instead of providing individual switch buttons 20 for each shelf as in our previously described machine, there is provided a movable switch box 125 which is shifted at each step in the operation of the machine to a position opposite the next succeeding layer. This switch box 125 is mounted for vertical movement on a carriage 126 slidably supported on a column 127 projecting upwardly from the machine table to the rear of the assembly frame 15. The movement of the carriage 126 is effected by means of a cable 128 running over pulleys 129 and attached at its free end to the cross-head 9, so that the switch box will move in unison with the cross-head.

The switch box is moved horizontally as well as vertically at each operation of the cross-head 9 and to this end the switch box 125 is suspended from the carriage 126 by means of parallel links 130 so that the switch box may move toward and from the assembly frame independently of the carriage 126.

This movement of the switch box is effected by means of a vertical operating rod 131 supported at its ends by links 132 mounted on the column 127. The column 127 projects through its bearing on the table top wherein it is mounted for oscillation and at its lower end is provided with a crank arm 133 connected by a suitable link with a crank 134 attached to the rock shaft 94 by means of which the driving clutch for the feed belt 3 is controlled. The carriage 126 is held against rotation with the column 127 by means of a fork 135 working on a fixed guide rod 136.

The switch box 125 contains four separate switches 137 arranged in series as shown in Fig. 27 and each having a projecting button 138 which, at each vertical movement of the switch box are brought opposite corresponding holes in the rear wall of the assembly frame 15 adjacent each shelf 16 and are then, by the horizontal movement of the box thrust through the holes into position to be engaged by the articles advanced into the frame by the feed belt. As the switches are in series, all four of the rows of articles making up a layer must be complete before the circuit will be closed and the solenoid 40 energized to shift the feed belt to the next shelf.

It will be understood of course that the machine may be otherwise modified within the scope of the appended claims.

The expressions "article", "layers of articles" etc., are used in the following claims in the generic sense and not to exclude a charge wherein a single article constitutes the entire layer.

We claim:

1. In a machine for packaging articles, the combination of a support on which the articles are assembled, a conveyor for advancing the articles to the support, and means actuated by the articles for shifting said conveyor to superimpose a second group of articles on the articles previously delivered to the support.

2. In a machine for packaging articles, the combination of a support on which the articles are assembled, a conveyor for advancing the articles to the support, means actuated by the articles for shifting said conveyor to superimpose a second group of articles on the articles previously delivered to the support, means for supporting a carton in juxtaposition to said support, and means for discharging the articles from said support into said carton.

3. In a machine for packaging articles, the combination of a support on which the articles are assembled, a conveyor for advancing the articles to the support, and means actuated by the articles for sifting said conveyor to superimpose a second group of articles on the articles previously delivered to the support, said last named means comprising a contact mechanism in position to be engaged by the batch of articles delivered to said support, and conveyor-shifting means set in motion by said contact mechanism.

4. In a machine for packaging articles, the combination of a support on which the articles are assembled in superimposed arrangement, a conveyor for advancing the articles to said support, means for shifting the conveyor with respect to said support and for delivering the articles in successive superimposed groups, means controlled by the articles for shifting said conveyor, said means comprising a plurality of contacts positioned respectively adjacent the superimposed layers of articles, and means controlled by said contacts for effecting a step-by-step movement of said conveyor.

5. In a machine for packaging articles, the combination of a support, means for arranging the articles in superimposed layers on said support, said means comprising a conveyor and means for elevating the conveyor step-by-step to feed the succeeding layers of articles over the preceding layers of articles, and means actuated by the last layer of articles for returning the conveyor to its initial position.

6. In a machine for packaging articles, the combination of a support, means for arranging the articles in superimposed layers on said support, said means comprising a conveyor and means for elevating the conveyor step-by-step to feed the succeeding layers of articles over the preceding layers of articles, means actuated by the last layer of articles for returning the conveyor to its initial position, said last named means comprising an independent member adapted to engage and support said conveyor at the conclusion of its upward movement, and means for gradually lowering said member.

7. In a machine for packing articles in cartons, a support, means for assembling on said support a charge of articles including means for delivering articles to said support, means actuated by the articles for raising said article-delivering means intermittently step-by-step to a predetermined elevation to thereby arrange said articles in superimposed layers, independent means for lowering said article-delivering means at one operation to its original position, and means for discharging the said charge of articles into a carton.

8. In a machine of the class described, a support, means for delivering articles to said support, means for raising said article-delivering means intermittently step-by-step to a predetermined elevation to thereby arrange said articles in superimposed layers, independent means for lowering said article-delivering means at one operation to its original position, and means for discharging the assembled articles into a carton, the operation of said last named means being initiated by the movement of the last layer of articles into position over the underlying layer.

9. In a machine of the class described, a support, means for delivering articles to said support, means for raising said article-delivering means intermittently step-by-step to a predetermined elevation to thereby arrange said articles in superimposed layers, independent means for lowering said article-delivering means at one operation to its original position, means for discharging the assembled articles into a carton, means actuated by said article-delivering means for setting said last-named means for operation, and means controlled by the movement of the articles constituting the top layer for initiating said operation.

10. In a machine of the class described, a support for articles to be packaged, a conveyor for delivering articles to said support, means for raising said conveyor intermittently step-by-step, means for operating said conveyor only while in stationary position between said step-by-step movements to thereby arrange the articles on the support in superimposed layers.

11. In a machine of the class described, a support for receiving a plurality of articles, a conveyor for delivering the articles to said support, means for intermittently raising said conveyor through successive steps to a predetermined elevation to thereby arrange said articles in superimposed relation, independent means for lowering said conveyor at one operation to its original position, means for stopping the movement of the conveyor for a predetermined period while making its step-by-step upward movements, and means for stopping said conveyor for a longer period while said conveyor is being lowered.

12. In a machine of the class described, a support on which articles are assembled, means for delivering articles to said support, means controlled by the articles delivered to said support for periodically shifting said article-delivering means to thereby arrange said articles in superimposed layers, and means for returning said article-feeding means to its original position after the desired number of layers have been assembled, said last-named means being controlled by the movement of the articles making up the topmost layer.

13. In a machine of the class described, the combination of a support, means for assembling articles on said support in superimposed arrangement, said means comprising a conveyor, means for elevating the conveyor in step-by-step fashion to a predetermined height, a one-rotation stop clutch for actuating said means, means actuated by said stop clutch for lowering said conveyor, and means controlled by the conveyor for causing said stop clutch to make two rotations during the lowering movement of said conveyor.

14. In a machine for packaging articles, the combination of a support upon which the articles are arranged in superimposed relation, a series of contacts adjacent respectively the positions of the superimposed layers, means controlled by said contacts for delivering the articles successively to said superimposed positions, said means operating to continuously feed articles to one position until the layer is complete irrespective of gaps in the line of articles coming into the machine.

15. In a machine for packaging articles, the combination of a support upon which the articles are arranged in superimposed relation, a series of contacts adjacent respectively the positions of the superimposed layers, means controlled by said contacts for delivering the articles successively to said superimposed positions, said means operating to continuously feed articles to one position until the layer is complete irrespective of gaps in the line of articles coming into the machine, said means comprising a shifting feed mechanism, a one-way clutch for effecting the shifting of said feed mechanism, a solenoid in circuit with said contacts for initiating the operation of said clutch, the circuit of said solenoid being closed by the contacts through the pressure of a full layer of articles.

16. In a machine of the class described, the combination of a support upon which articles are assembled in superimposed relation, a shifting feed mechanism for feeding the articles to said support, a stop clutch controlled by the movement of the articles for effecting the shifting of said feed mechanism, a solenoid for operating said clutch, contacts in position to be engaged by said articles for energizing said solenoid, means for moving said feed mechanism back to its initial position and a second contact controlled by the position of said feed mechanism for effecting the operation of said last named means.

17. In a machine for packaging articles, the combination of a support on which the articles are assembled, a conveyor for advancing the articles to the support, means actuated by the articles for raising said conveyor intermittently step-by-step to a predetermined elevation to thereby arrange said articles in superimposed layers, and independent means for lowering said conveyor at one operation to its original position.

WALLACE D. KIMBALL.
CORNELIUS I. BRAREN.
MALCOLM McFAULL.